United States Patent [19]
Whitman

[11] Patent Number: 6,010,625
[45] Date of Patent: Jan. 4, 2000

[54] SCREEN CHANGER WITH CONTROLLED GAP

[75] Inventor: Timothy W. Whitman, Hamilton, Mass.

[73] Assignee: Beringer LLC, Marblehead, Mass.

[21] Appl. No.: 08/950,671

[22] Filed: Oct. 16, 1997

[51] Int. Cl.[7] .......................... B01D 29/62; B01D 29/96; B29C 47/68

[52] U.S. Cl. .......................... 210/236; 210/447; 210/450; 425/185; 425/192 R; 425/197; 425/199

[58] Field of Search ..................................... 210/236, 232, 210/450, 447; 425/197, 199, 185, 192 R

[56] References Cited

U.S. PATENT DOCUMENTS

| | | |
|---|---|---|
| 3,471,017 | 10/1969 | Kalman . |
| 3,675,934 | 7/1972 | Heston . |
| 3,684,419 | 8/1972 | Voight . |
| 3,804,758 | 4/1974 | Cooper . |
| 3,856,277 | 12/1974 | Tiramani . |
| 3,900,399 | 8/1975 | Kreyenborg et al. . |
| 3,947,202 | 3/1976 | Goller . |
| 3,962,092 | 6/1976 | Newman . |
| 3,983,038 | 9/1976 | Heston . |
| 4,025,434 | 5/1977 | Mladota . |
| 4,237,014 | 12/1980 | Trott . |
| 4,265,756 | 5/1981 | Schiesser . |
| 4,277,338 | 7/1981 | Hoagland . |
| 4,588,502 | 5/1986 | Zibell et al. . |
| 5,417,866 | 5/1995 | Trott . |
| 5,439,589 | 8/1995 | Whitman . |
| 5,507,498 | 4/1996 | Trott . |
| 5,605,626 | 2/1997 | Gneuss . |

Primary Examiner—Thomas M. Lithgow
Attorney, Agent, or Firm—Lahive & Cockfield, LLP

[57] ABSTRACT

A continuous flow filter changer for a fluid having a filter carrier assembly for intermittent sliding transition displacements in a filter channel to align adjacent filters thereon successively with a filter aperture in the flow passage. The duration of each such transition is substantially less than that between transitions. A ring shaped seal sealingly connects between the flow passage upstream thereof and a filter aligned with said aperture to prevent fluid flow except through said filter. The clearance for sliding between the filter carrier assembly and the filter channel is controlled to allow for such displacements while limiting the fluid leakage from the filter channel during a single transition to a predetermined level.

12 Claims, 6 Drawing Sheets

SCREEN CHANGER WITH CONTROLLED GAP

BACKGROUND OF THE INVENTION

This invention relates generally to filter changers for fluids comprising apparatus to replace a clogged filter with a fresh filter within a fluid flow passage. More particularly, it relates to screen changers useful in the polymer industry for the filtration of heated, pressurized polymer in liquid form as it flows from an extruder to any of various types of polymer forming equipment.

Typically, in the polymer application two or more filters are mounted in a line on a carrier assembly adapted to locate the filters successively in a filter aperture that communicates between upstream and downstream polymer flow passages. The filter carrier assembly slides within a filter channel that extends transversely of the polymer passages through the filter aperture to the exterior of the filter changer, whereby clogged filters are made accessible for cleaning or replacement with fresh filters. In the following description, a filter is described as "on line" when it is fully aligned in the filter aperture, and a "transition" is the time interval of a displacement of the filter carrier assembly that replaces one filter by the next in the on line position.

A principal object of the invention is to provide improved means for sealing against the escape of polymer through the filter channel, typically under high pressure applied by the extruder, during both the periods when filters are on line and the transition intervals.

A further object is to provide improved means which, in addition to providing the foregoing sealing functions, are adapted for use in continuous flow changers that purge each filter of air and prefill it with polymer before it is aligned in the filter aperture.

Typical screen changers comprise a body forming upstream and downstream flow passages with a filter aperture communicating between the passages, and also forming a filter channel transverse to the passages and extending through the filter aperture to the exterior of the body. A filter carrier assembly is slidably mounted in the filter channel for translational or rotational movement.

Simple slide plate screen changers are illustrated by U.S. Pat. No. 3,675,934 to Heston and U.S. Pat. No. 5,439,589 to Whitman. These patents disclose annular seals fitted in the body and surrounding the filter aperture, bearing against the filter carrier assembly or plate.

The polymer pressure and/or mechanical pressure is applied to the seal upstream of the filter aperture, causing the seal to bear upon the filter carrier assembly or the filter then located in the filter aperture, thereby containing the polymer and preventing its flow into the filter channel. In this type of changer the sealing surface area is generally of small size and located close to the filter aperture, but sufficient to comply with, and remain in sealing contact with, small irregularities in the mating surfaces of the filter carrier, the filter channel and the flow passages.

In these simple changers, during the on line condition the pressure within the filter channel surrounding the sealing surface is substantially atmospheric because large clearances, typically one-half to two inches, exist between the filter carrier assembly and the filter channel. A large pressure differential is therefore effective across the seal and causes it to bear upon the on line filter. However, during a transition polymer readily escapes into the filter channel at a rate that is often sufficiently high to vent the polymer pressure to atmospheric pressure, disrupting the forming process. Therefore, the transition must be a short interval to reduce the loss of polymer and the resulting process disruption.

Where the filter changer has filters spaced so that a filter moving into alignment with the filter aperture becomes partially exposed to the upstream passage pressure before the active area of the filter moving out of alignment ceases to be exposed to such pressure, the flow of fluid from the upstream passage to the downstream passage is continuous during the transition. This provides an opportunity for purging air from the on-coming filter and prefilling it with polymer before it becomes fully aligned in the filter aperture. In U.S. Pat. No. 4,025,434 to Mladota a purge conduit is located so that it is isolated from the flow passages while a filter is on line, but provides a path for the purging of air from an on-coming filter during the transition movement as it enters the filter aperture, allowing it to be prefilled with polymer. In U.S. Pat. No. 4,588,502 to Zibell et al, alternative means for evacuating air from the on-coming filter are provided in the form of a suction pump.

In these continuous flow changers, excessive polymer leakage must be suppressed throughout the transition while the on-coming filter is being purged of air and the exiting filter remains exposed to the upstream polymer pressure. Taking into account the dimensions of the filters as measured in the direction of the transition movement, this requires sealing means that are effective over an area considerably greater in extent than that employed in simple slide plate changers. This broad sealing region must extend the width of a filter element away from the flow passage. Experience has shown that compliant contact seals are difficult to construct with sealing regions large enough to contain the polymer adequately. Consequently, the structural parts of screen changers of this type must be fabricated with extreme precision and bulky dimensions, and at considerable cost. The operating conditions also tend to be sensitive to changes in pressure and temperature of operation, and substantial maintenance costs are typical. In many designs surface irregularities in the sliding plate and the filter channel can only be accommodated by the elastic resilience of the structures.

One technique for providing a broad sealing region without contact between opposing surfaces of the filter channel and filter carrier assembly employs the chilling of a plug of polymer. An example is disclosed in U.S. Pat. No. 3,471,017 to Kalman. The use of chilling apparatus results in complexity of structure and unreliability in the event of pressure or temperature excursions of the polymer melt.

A principal object of this invention is to provide sealing means, particularly for continuous flow filter changers, that do not require the structural bulk, precision of manufacture and complexity of the foregoing types of changers, and do not have the same sensitivity to temperatures, viscosities and pressures, with the associated requirements for precise adjustment and maintenance in use.

BRIEF SUMMARY OF THE INVENTION

With the foregoing objects in view, this invention features a combination of two sealing means, namely a first, ring-shaped seal that effectively seals between the upstream polymer flow passage and a filter in the on line position, and a second seal comprising a controlled clearance between the slide surfaces of the filter channel and filter carrier assembly, sufficiently restricting the leakage of polymer for the duration of each transition to a predetermined, tolerable level.

These dual means for sealing permit substantial reduction in the cost of manufacture and maintenance, simplifying installation and reducing the sensitivity of the changer to operating conditions.

A further feature is that air purging of the on-coming filter and prefilling with polymer can be accomplished in a continuous flow changer.

In the presently preferred embodiment, polymer pressure on the upstream side of the seal is employed to force it into contact with the filter plate. This seal provides complete containment of polymer during the relatively long periods while a filter is on line. Each such period may be 30 minutes or up to 72 hours in duration, or more.

A characteristic of the present invention is that the clearance between the slide surfaces of the body and filter carrier assembly is controlled to fall within a range in which two conditions are simultaneously satisfied. The first condition is that the clearance must be sufficiently large to allow for transition displacement of the filter carrier assembly. For example, the clearance may be as much as 0.003 to 0.005 inch or even larger in some applications. The second condition is that the clearance must be sufficiently small to restrict the volume of polymer leakage from the filter channel to the exterior of the body during the interval of a single transition. This second condition is independent of the duration of time between transitions because the ring-shaped seal is alone sufficient for complete polymer containment while a filter is on line.

DETAILED DESCRIPTION

Figure 1:
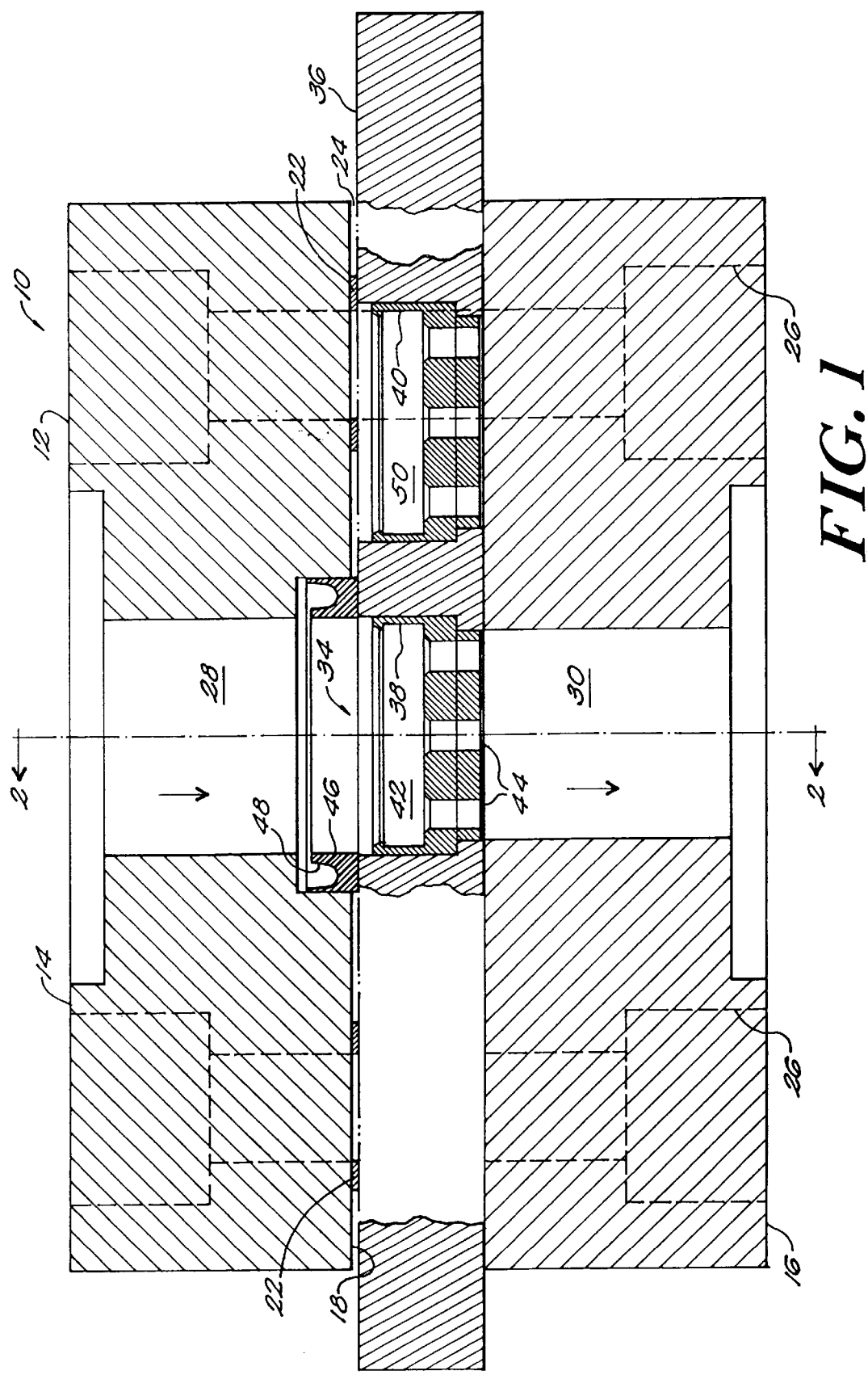
FIG. 1 is a plan view in section of a first embodiment of the invention, taken on a horizontal plane containing the center line of the polymer flow passages.

FIGS. 1 to 4 illustrate the presently preferred embodiment of the invention. The screen changer illustrated generally at 10 has a body 12 comprising blocks 14 and 16. The blocks have planar, mutually parallel surfaces 18 and 20, the surfaces being spaced by washers 22 (FIG. 2) to form a clearance gap 24. The blocks 14 and 16 are rigidly assembled with the washers 22 by suitable bolts (not shown) passing through bores 26 illustrated in broken outline. The block 14 has a cylindrical bore forming an upstream polymer flow passage 28, and the block 16 has a cylindrical bore forming a downstream flow passage 30 coaxial with the passage 28.

Suitable means (not shown) are provided for connection of the upstream passage 28 with a polymer extruder, and suitable means (not shown) are provided for connection of the downstream passage 30 with polymer forming apparatus of any desired type.

A filter channel 32 (FIG. 2) is formed in the block 16 and extends transversely of the flow channels 28 and 30 through a filter aperture 34 which communicates between the passages. The filter channel extends to the exterior of the body 12. A filter carrier in the form of a slide plate 36 is slidably received in the filter channel 24. The carrier has a number of spaced thru holes each adapted for removably receiving a filter element, two adjacent elements 38 and 40 being shown for purposes of illustration. It will be understood that one or more additional filters (not shown) are provided on the slide plate 36 and all filters are equally spaced thereon. The filters may be constructed in any desired manner, shown in a typical form comprising a cavity 42 facing upstream toward the passage 28 and a plurality of screen elements 44 for filtering impurities or coagulants from the flowing polymer. In FIG. 1 the filter 38 is shown in the on line position, aligned with the filter aperture 34.

A counterbore in the block 14 forms an annular recess for receiving a polymeric seal 46 closely fitting the counterbore and formed with an upstream surface 48 continually communicating with the polymer pressure in the upstream passage 28. The seal 46 bears annularly upon the surface of the slide plate 36, forming a seal fully effective to prevent any escape of polymer into the gap 24 while the filter 38 remains in the on line position.

Figure 3:
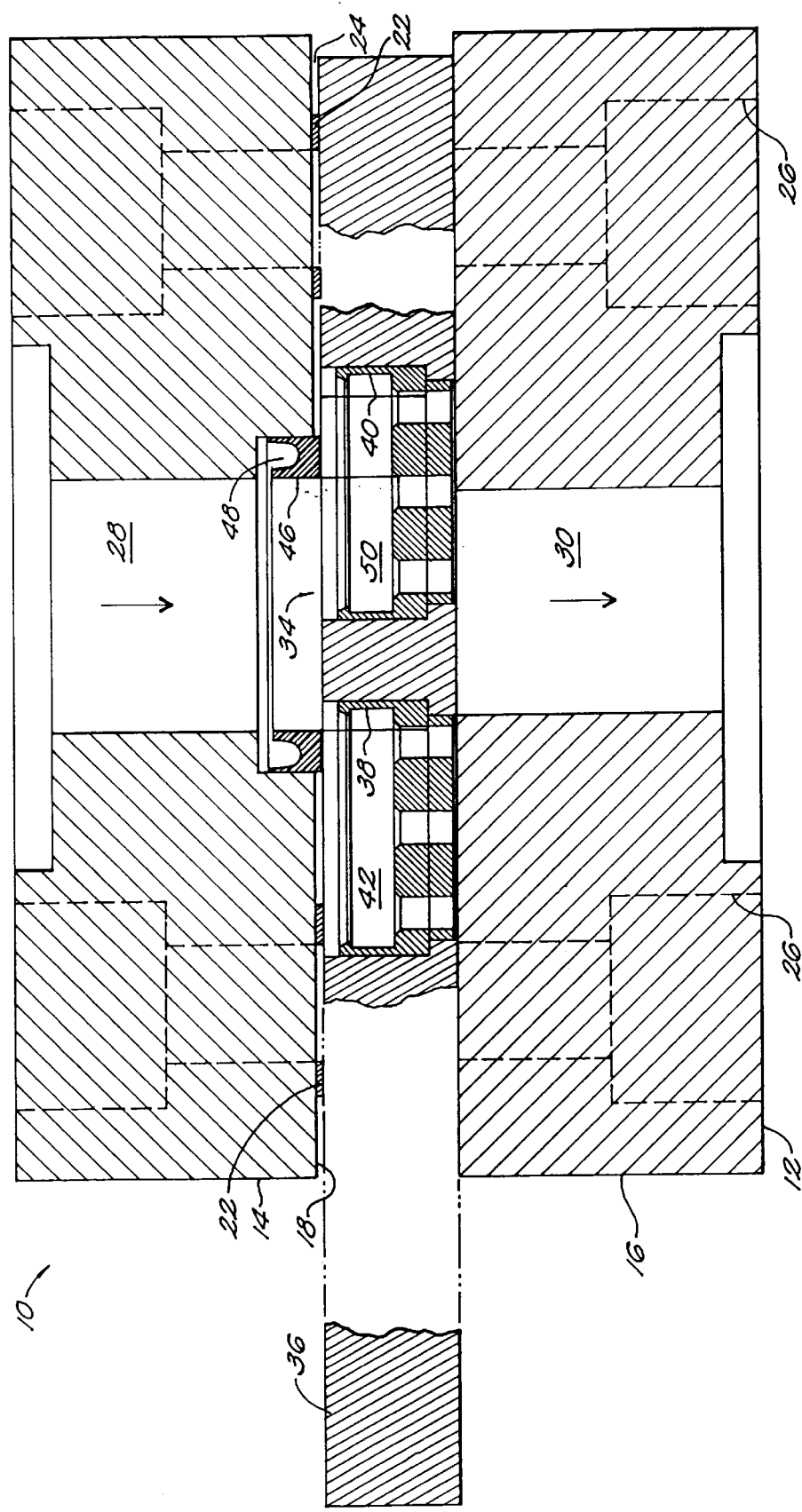
FIG. 3 is a plan view similar to FIG. 1 showing the filter carrier assembly undergoing a transition displacement.

In operation, the filter 38 may be on line in a typical application for a period of 30 minutes to 72 hours or more, depending on the amount of impurities or coagulants in the process polymer. When the filter 38 becomes partially occluded, it is replaced by the adjacent filter 40 by sliding the filter carrier plate 36 during a transition, FIG. 3 illustrating the slide plate in an intermediate position during that interval. The transition interval may be, for example, 3 to 300 seconds in duration. In FIG. 3 it will be seen that the spacing of the filters 38 and 40 on the slide plate is such that the cavity 50 of the filter 40 becomes exposed to the upstream passage 28 and downstream passage 30 before the cavity 42 of the filter 38 ceases to be exposed to the upstream and downstream passages. Therefore, polymer flow from the passage 28 to the passage 30 is continuous during the transition. Also, polymer entering and eventually filling the cavity 50 forces the air from that cavity and expels it through the gap 24 to the exterior of the body 12.

In addition, FIG. 3 shows that upstream polymer pressure is communicated through the cavity spaces of the filters to the gap 24 over an area large enough to enclose the cavities 42 and 50. Polymer leakage into the gap 24 may then occur, but is limited by the dimension of the gap 24 as determined by the thickness of the spacing washers 22, and may occur only during the transition movement, terminating when the seal 46 annularly surrounds the filter cavity 50 of the on-coming filter 40.

The dimension of the gap 24 is controlled between the limits set by two opposing conditions. On the one hand, the gap 24 must be sufficiently large to allow the filter plate 36 to move slidably within the filter channel without excessive binding arising, for example, from surface irregularities or movements in response to varying pressure and temperature conditions. On the other hand, the gap must be sufficiently small to restrict the escape of polymer to the exterior of the body during any single transition displacement, to a predetermined limit.

Figure 2:
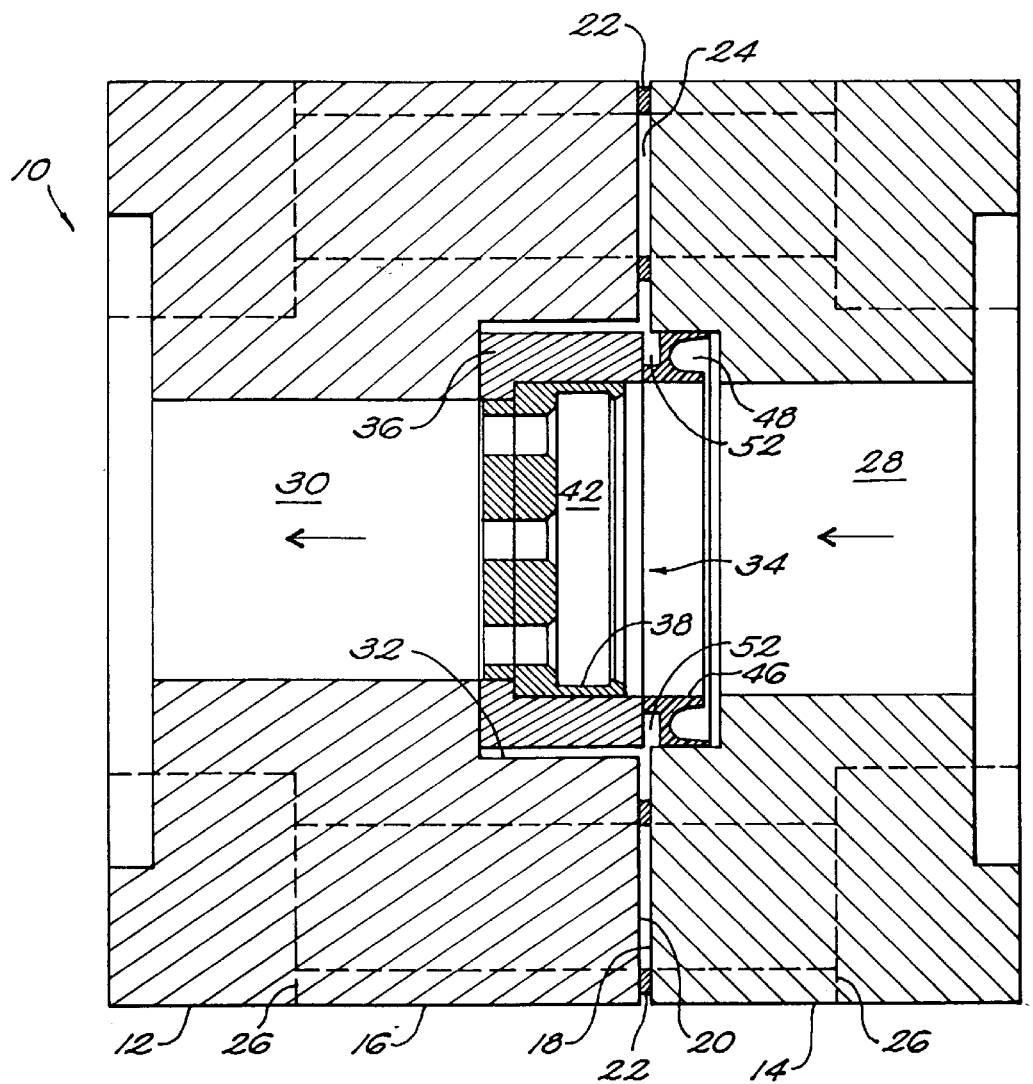
FIG. 2 is an elevation in section taken on line 2—2 of FIG. 1.
Figure 4:
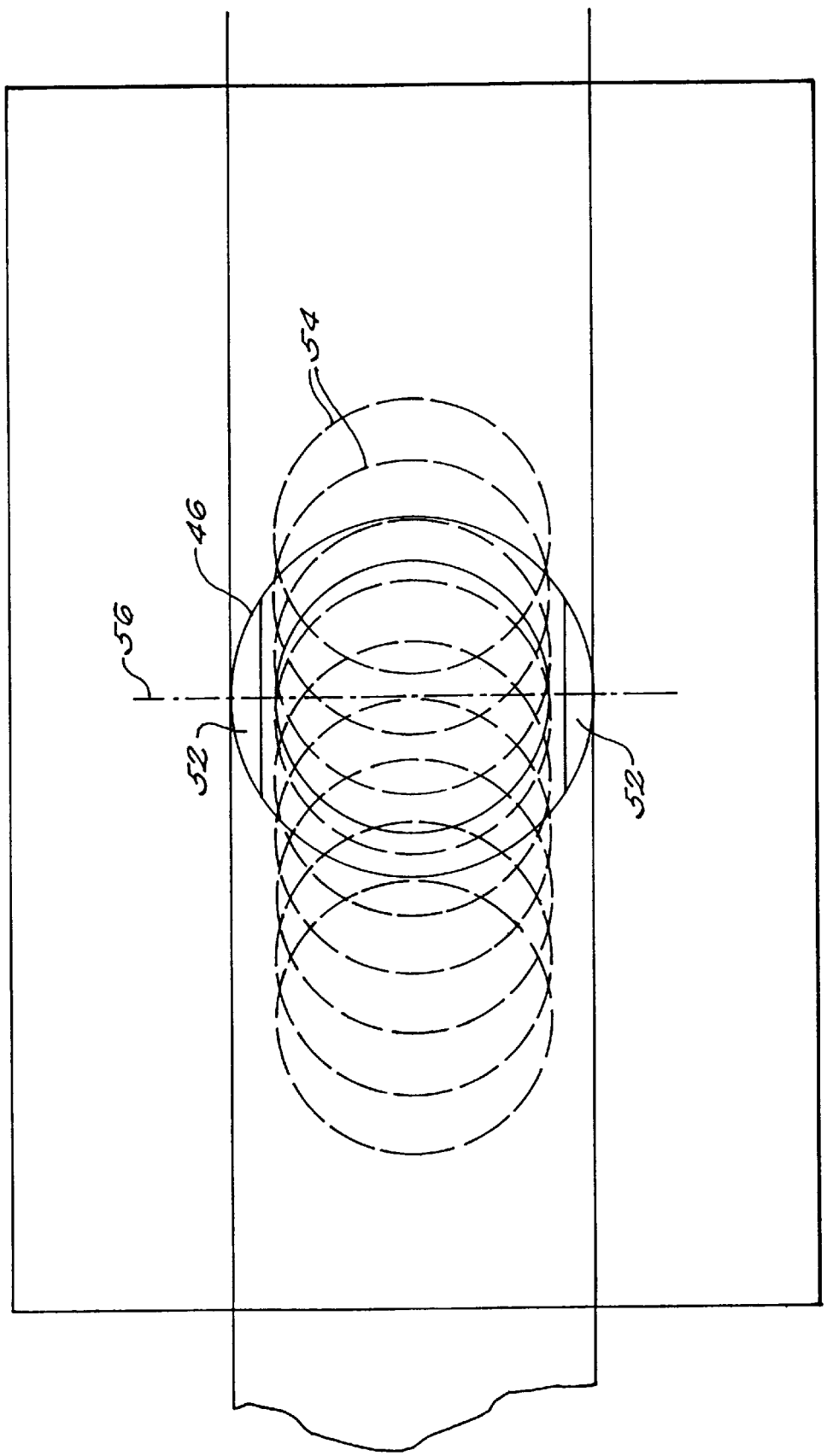
FIG. 4 is a fragmatic front elevation of the embodiment of FIG. 1 illustrating successive filter positions during a transition displacement.

In a practical embodiment, satisfaction of the latter condition on the dimension of the gap 24 often substantially reduces the pressure differential between the upstream and downstream effective areas of the seal 46 when a filter is on line. This is best seen in FIG. 1. This condition arises because of the limited dimension of the gap 24 and the entry of polymer into this gap. If those effective areas are substantially equal, there is little net force applied to the seal and by the seal to the slide plate 36. To increase the net force, the downstream face of the seal 46 is preferably formed with relieved areas 52 extending along the portions thereof that do not become exposed to the upstream passage during a transition movement, as best seen in FIGS. 2 and 4. In FIG. 4, broken circular lines 54 represent the successive positions of a filter cavity such as 50 as it enters and leaves the on line position identified by a broken line 56 through the center line of the flow passages. This reduces the downstream effective area of the seal 46, increasing the net pressure force on the seal in the appropriate direction to sustain a force upon the slide plate 36.

Figure 5:
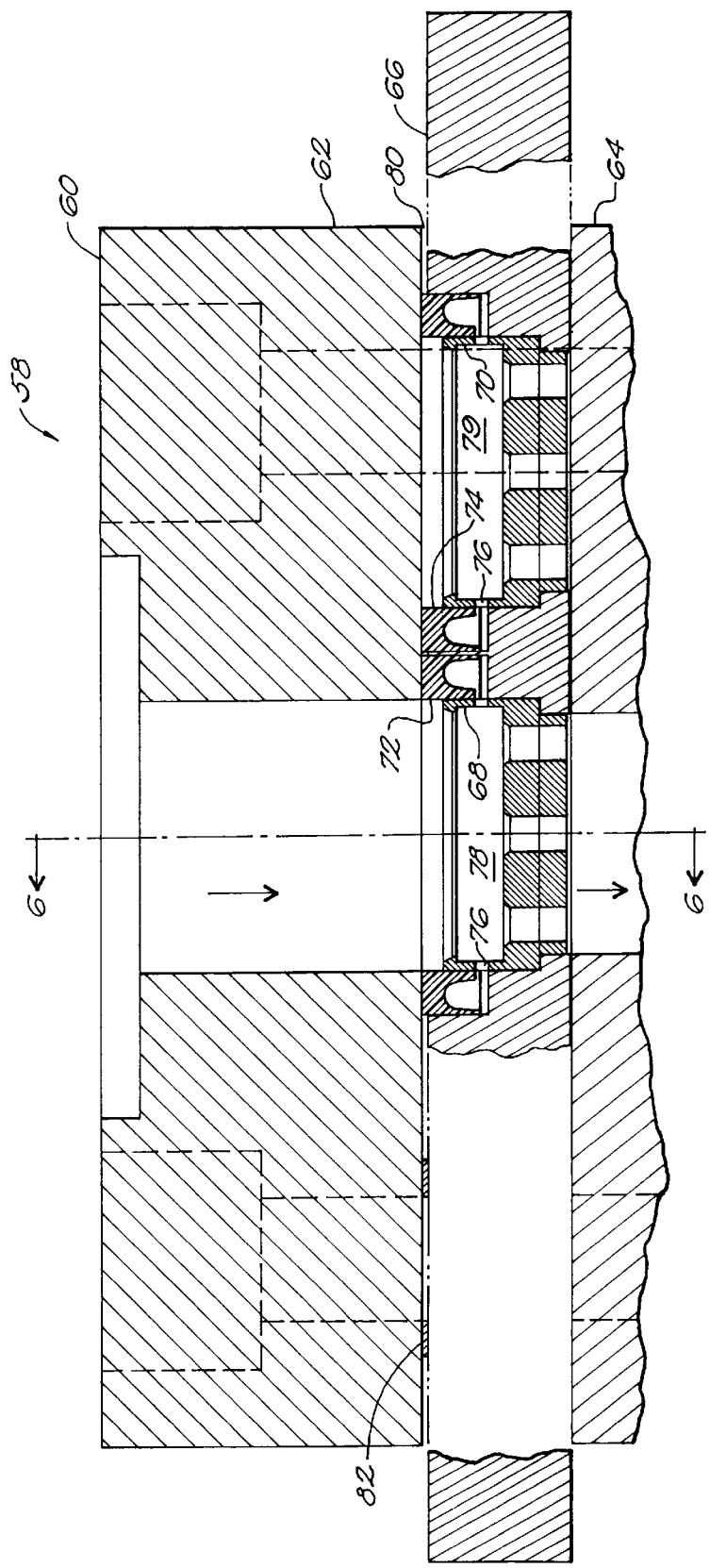
FIG. 5 is a plan view in section similar to FIG. 1 showing a second embodiment of the invention.
Figure 6:
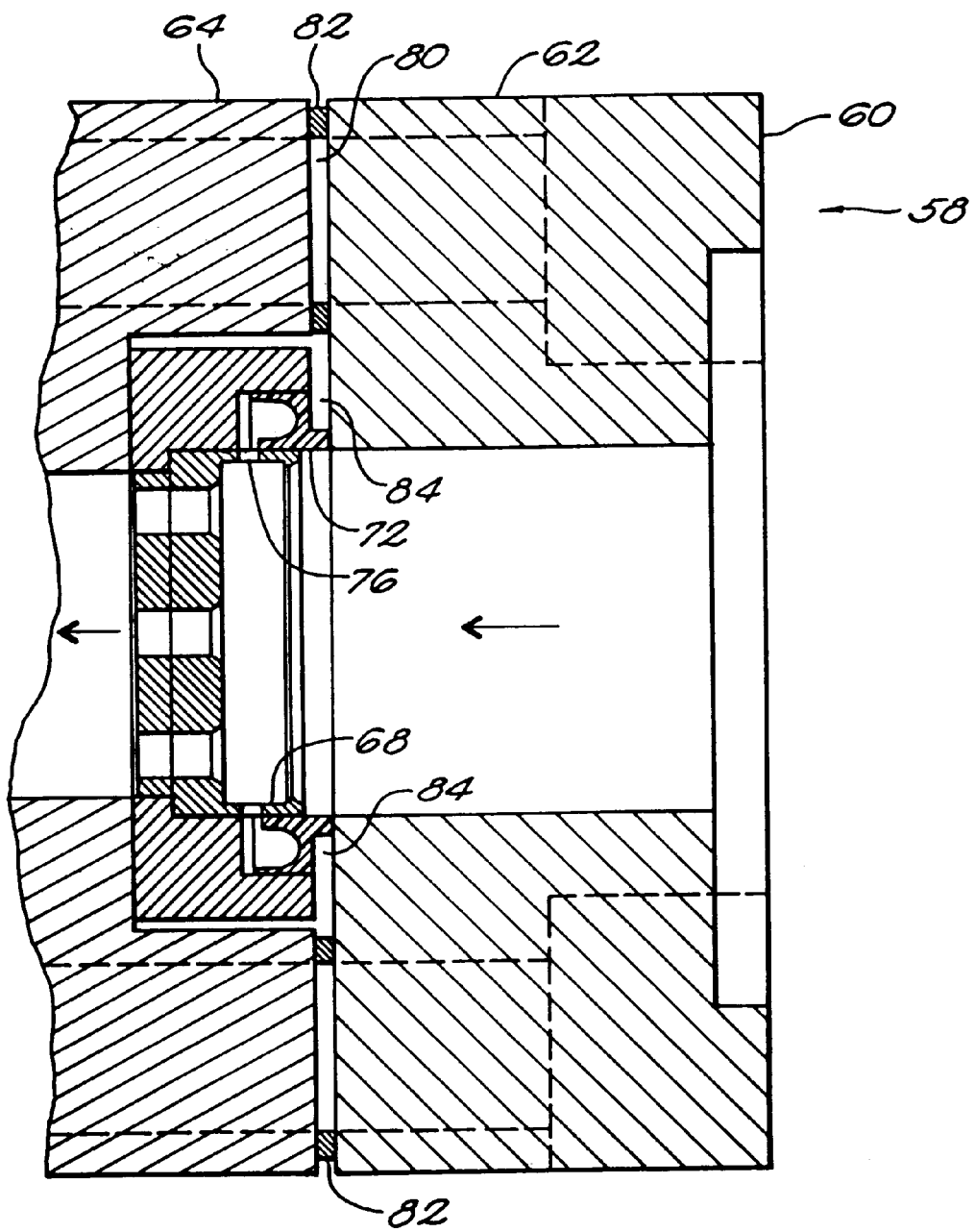
FIG. 6 is an elevation in section taken on line 6—6 of FIG. 5.

FIGS. 5 and 6 illustrate a second embodiment of the invention in which each filter on the filter carrier assembly has a separate seal. A continuous flow filter changer illustrated generally at 58 comprises a body 60 formed of blocks 62 and 64. The block 62 is similar to the block 14 except that it omits the counterbore for receiving a seal. The block 64 may be substantially identical to the block 16. The filter carrier assembly comprises a slide plate 66 having a series of spaced bores therein for removably receiving filters 68 and 70 and other filters (not shown), spaced to provide continuous polymer flow during each transition.

Each filter receiving bore in the slide plate is counterbored for receiving a seal such as 72 and 74 adapted to bear on the sliding surface of the block 62 within the filter channel. One or more lateral holes 76 are formed to communicate between each filter cavity 78, 79 and the downstream surface of the seal 72, 74. The filter 68 in the on line position provides communication of the upstream polymer pressure to the downstream face of the seal 72, forcing it against the block 62 and completely sealing the polymer from entering a gap 80 controlled by washers 82, similar in function to the washers 22 of FIG. 2.

As shown in FIG. 6, the upstream sealing area of each filter has two relieved areas 84 similar in function to the areas 52 of FIG. 4, reducing the effective sealing area of the seal against the filter channel. This results in a net pressure force of the seal against the filter channel that remains effective between transitions when the pressure in the gap 80 becomes substantially equal to the upstream polymer pressure.

The dual pressure sealing modes of the present invention provide important advantages over prior technology without the sacrifice of function, including the air evacuation and prefilling of on-coming filters in continuous flow changers. In practical terms, these advantages result in a more robust, dimensionally tolerant machine that is free of complex structures necessitated by prior attempts to contain the polymer during filter changes.

In structural terms, these advantages arise from dimensional considerations, particularly the size of the gaps 24 and 80 between the sliding surfaces of the filter carrier assembly or slide plate and the filter channel. This is further explained as follows. A generally accepted measure of the leakage rate of polymer through a slit, in this case the gap 24 or 80, as a function of the slit thickness under certain typical conditions, is the slit thickness raised to an exponent between 2.8 and 3.0. Thus, if a gap of 0.0003 inch leaks one ounce of polymer under given operating conditions in a given time, then a gap of 0.003 inch would be expected to leak 50 pounds in the same period. The amount of leakage increase may be even greater if a threshold of capillary containment is breached. Typical continuous flow filter changers in the prior art depend on the gap dimension to be small enough for an effective seal during the extended periods while filters are on line. Because of the relationship of gap dimension to leakage rate, such prior art changers have very close tolerances defining gaps typically in the range of 0.0001 to 0.001 inch.

In contrast, according to this invention it is not necessary to depend on a close and precise gap dimension for sealing while filters are on line. The gap dimension provides sealing only during the brief interval of a transition and may be much larger. In current designs, for example it may be in the range of 0.003 to 0.005 inch with greatly reduced sensitivity to dimensional variations as compared to the prior art.

Therefore, the sensitivity of polymer leakage rates to changes in the gap dimensions, due to manufacturing tolerances or fluctuating operating conditions, is beneficially and substantially reduced. Accordingly, continuous flow filter changers can be manufactured more cheaply and operated and maintained at substantially reduced cost.

In the above described embodiments, the dimensions of the gaps 24 and 80 are conveniently determined by selecting washers 22 and 82, respectively, of the appropriate thicknesses. If desired, shims, spacers or other means may be employed for fixing the gaps, as will be evident to anyone skilled in the art. In practice, the optimal gap is usually determined empirically as a function of the several parameters that influence leakage rates, including the formulation, temperature and pressure of the particular process polymer in use.

I claim:

1. A filter changer for a fluid, comprising
a pair of members having opposed, generally conforming surfaces,
gap forming means adapted to connect said members rigidly to form a predetermined adjustable space between said surfaces, said members respectively forming upstream and downstream passages extending transversely of said surfaces and a filter aperture communicating between said passages, said members respectively having spaced parallel slide surfaces defining a filter channel extending transversely of said passages through the filter aperture to the exterior of said members,
a filter carrier assembly having spaced parallel surfaces slidable between said slide surfaces, at least two spaced filter openings and filters in said openings each having an area for exposure to the upstream passage when aligned with said aperture,
means adapted to displace the filter carrier assembly by intermittent transition displacements to align said filters with the filter aperture successively, the duration of each displacement being substantially less than that between displacements, and
a ring shaped seal in the filter aperture adapted for sealingly connecting between said area of a filter aligned therewith and said upstream passage, said gap forming means being adjusted to cause the space between said slide surfaces to exceed the space between said surfaces of the filter carrier assembly, thereby producing an adjustable leakage gap for fluid effective during said transition displacements.

2. A filter changer according to claim 1, which the filter carrier assembly comprises a plate having a plurality of filter openings therein.

3. A filter changer according to claim 1, which the seal is fitted in the upstream passage and bears slidingly and sealingly on the carrier assembly.

4. A filter changer according to claim 3, in which the seal has an upstream effective area exposed to the upstream passage.

5. A filter changer according to claim 4, in which the seal has a downstream effective sealing area against the filter carrier assembly that is less than said upstream effective area.

6. A filter changer according to claim 5, in which the seal has a downstream surface area spaced from the filter carrier assembly and isolated from the upstream passage when a filter is aligned with said aperture.

7. A filter changer according to claim 1, in which the filter carrier assembly has a ring shaped seal secured about said area of each filter and sealingly connecting between said area thereof and the upstream passage when said filter is aligned with said aperture.

8. A filter changer according to claim 7, in which each seal has a downstream effective area exposed to the upstream passage when aligned with said aperture.

9. A filter changer according to claim 8, in which each seal has an upstream effective sealing area against the slide surfaces of said channel that is less than said downstream effective area.

10. A filter changer according to claim 9, in which each seal has an upstream surface area spaced from the slide surfaces of said channel and isolated from the upstream passage when aligned with said aperture.

11. A filter changer according to claim 1, in which the filter openings are spaced to cause said area of a filter moving into alignment to be exposed to the upstream passage before said area of the filter moving out of alignment ceases to be exposed to the upstream passage.

12. A filter changer according to claim 1, in which the gap forming means comprise replaceable washers of predetermined thickness separating the opposed surfaces of said members.

* * * * *